United States Patent
Nakano et al.

(10) Patent No.: US 9,840,756 B1
(45) Date of Patent: Dec. 12, 2017

(54) SYSTEM AND METHOD FOR REGENERATION AND RECIRCULATION OF A REDUCING AGENT USING HIGHLY EXOTHERMIC REACTIONS INDUCED BY MIXED INDUSTRIAL SLAGS

(71) Applicants: Jinichiro Nakano, Albany, OR (US); James P. Bennett, Salem, OR (US); Anna Nakano, Albany, OR (US)

(72) Inventors: Jinichiro Nakano, Albany, OR (US); James P. Bennett, Salem, OR (US); Anna Nakano, Albany, OR (US)

(73) Assignee: U.S. Department of Energy, Washington, DC (US)

( * ) Notice: Subject to any disclaimer, the term of this patent is extended or adjusted under 35 U.S.C. 154(b) by 223 days.

(21) Appl. No.: 14/790,082

(22) Filed: Jul. 2, 2015

Related U.S. Application Data

(60) Provisional application No. 62/065,041, filed on Oct. 17, 2014.

(51) Int. Cl.
| | |
|---|---|
| *C22B 5/12* | (2006.01) |
| *C01F 11/00* | (2006.01) |
| *C01G 31/00* | (2006.01) |
| *C01G 31/02* | (2006.01) |
| *C22B 34/22* | (2006.01) |

(52) U.S. Cl.
CPC .............. *C22B 34/22* (2013.01); *C01F 11/00* (2013.01); *C01G 31/00* (2013.01); *C01G 31/02* (2013.01); *C22B 5/12* (2013.01)

(58) Field of Classification Search
CPC ........... C22B 5/12; C01F 11/00; C01G 31/00; C01G 31/02
See application file for complete search history.

(56) References Cited

U.S. PATENT DOCUMENTS

| | | | |
|---|---|---|---|
| 8,703,021 B1 * | 4/2014 | Kwong | C10J 3/466 252/373 |
| 2010/0212457 A1 * | 8/2010 | Drnevich | C01B 3/061 75/414 |

OTHER PUBLICATIONS

Barati et al., "Energy recovery from high temperature slags," Energy 36 (2011).
Zhang et al., "A review of waste heat recovery technologies towards molten slag in steel industry," Applied Energy 112 (2013).
Bisio, "Energy Recovery from Molten Slag and Exploitation of the Recovered Energy," Energy 22 (1997).

* cited by examiner

*Primary Examiner* — Roy King
*Assistant Examiner* — Tina M McGuthry Banks
(74) *Attorney, Agent, or Firm* — Timothy L. Harney; Daniel D. Park; Brian J. Lally

(57) ABSTRACT

Embodiments relate to systems and methods for regenerating and recirculating a CO, $H_2$ or combinations thereof utilized for metal oxide reduction in a reduction furnace. The reduction furnace receives the reducing agent, reduces the metal oxide, and generates an exhaust of the oxidized product. The oxidized product is transferred to a mixing vessel, where the oxidized product, a calcium oxide, and a vanadium oxide interact to regenerate the reducing agent from the oxidized product. The regenerated reducing agent is transferred back to the reduction furnace for continued metal oxide reductions.

20 Claims, 2 Drawing Sheets

SYSTEM AND METHOD FOR REGENERATION AND RECIRCULATION OF A REDUCING AGENT USING HIGHLY EXOTHERMIC REACTIONS INDUCED BY MIXED INDUSTRIAL SLAGS

RELATION TO OTHER APPLICATIONS

This patent application claims priority from provisional patent application 62/065,041 filed Oct. 17, 2014, which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a system and method for the regeneration and recirculation of a reducing agent used for the reduction of a metal oxide ore in a reduction furnace, where reduction via the reducing agent of CO, $H_2$, or combinations thereof generates an oxidized product of $CO_2$, $H_2O$, or combinations thereof. The oxidized product is exhausted from the reduction reactor and transferred to a mixing vessel where the oxidized product, a calcium oxide, and a vanadium oxide regenerate the reducing agent and heat, and the regenerated reducing agent is transferred back to the reduction furnace for continued metal oxide reductions.

BACKGROUND

A large number of metals are produced from oxide raw materials. Typically, except for oxides of the more noble metals, the metals are produced from the oxides by reduction processes using a reducing agent, such as carbon monoxide, hydrogen, or in some cases other metals, such as aluminum which has a higher thermodynamic affinity for oxygen. Generally, carbon monoxide, and hydrogen are the reducing agents which are of the greatest industrial and economic importance.

Carbon monoxide and hydrogen are usually produced from raw materials such as coal, oil, or natural gas in practice. Dissociation of $CO_2$ and $H_2O$ into CO and $H_2$, respectively, requires a large amount of energy for the reaction to be spontaneous, and is considered impractical by industries. At 1300° C., about 160 kJ/mol is thermodynamically required to initiate the dissociation of $H_2O$, while about 147 kJ/mol is required for the spontaneous conversion of $CO_2$. Because of these requirements, waste heat effectively available in typical processes is insufficient to induce the full dissociation, and usually allows conversion of a small fraction of $CO_2$ and $H_2O$ to CO and $H_2$. Typical investigations on the utilization of metallurgical slag waste heat have concentrated on thermal energy recovery, direct generation of electricity using thermoelectric principles, and production of fuel gases using endothermic reactions such as reforming of hydrocarbons or decomposition of methanol. See e.g., Barati et al., "Energy recovery from high temperature slags," *Energy* 36 (2011); see also Zhang et al., "A review of waste heat recovery technologies towards molten slag in steel industry," *Applied Energy* 112 (2013); see also Bisio. "Energy Recovery from Molten Slag and Exploitation of the Recovered Energy," *Energy* 22 (1997), among others. It would be advantageous if metallurgical slags could be directly utilized in a system for the dissociation of $CO_2$ and $H_2O$ into CO and $H_2$ in order to directly support the reducing agent inventory required for reduction furnace operations with minimal energy loss.

Slag is generally a molten mixture of process waste ashes from the power and metallurgical industries and, at metallurgical plants, are typically tapped from a furnace at high temperatures. Metallurgical slag from steel production typically contains high CaO, while gasification power plants using petcoke carbon feedstock produce $V_2O_3$-bearing slags. Typical chemical compositions of metallurgical slags and petcoke ashes are given in TABLE 1. In industry, up to 60 wt. % CaO has been reported in metallurgical slags and up to 74.5 wt. % $V_2O_5$ in petcoke ash (note vanadium oxide is present as $V_2O_3$ in ash slags from entrained bed gasification. In regions such as China, Eastern Europe, Scandinavia, South Africa, and Russia; where vanadium rich iron ore is processed to produce pig iron; high vanadium oxide content in metallurgical ash/slag is commonly found. In BOF (basic oxygen furnace) slags in Russia, for example, up to 14 wt. % $V_2O_5$ can be found. A recent trend of increasing petcoke use as a carbon feedstock in integrated gasification combined cycle (IGCC) power plants has resulted in elevated $V_2O_3$ concentration in some of the slags. CaO exhibits a strong thermodynamic affinity for $V_2O_3$, resulting in the formation of calcium orthovanadate in a highly exothermic reaction. If CaO-rich metallurgical slags as discharged are appropriately reacted with those from gasification processes using petcoke or other metallurgical processes bearing high vanadium slags, calcium orthovanadate will form, enabling the production of CO and $H_2$ from $CO_2$ and $H_2O$. This disclosure discusses a potential approach to produce fuels from slag waste streams and gas waste streams by blending these industrial slags as tapped from a furnace at a metallurgical plant or at any economically feasible location.

These and other objects, aspects, and advantages of the present disclosure will become better understood with reference to the accompanying description and claims.

SUMMARY

The current disclosure relates to metal oxide reduction using a reducing agent of CO, $H_2$, or combinations thereof, where the reduction typically generates a metal, reduced metal oxides, ash/slag, and an oxidized product of $CO_2$, $H_2O$, or combinations thereof. The disclosure regenerates and recirculates the reducing agent by generating an exhaust of the oxidized product from a reduction reactor and transferring the exhaust to a mixing vessel, where the oxidized product, a calcium oxide, and a vanadium oxide interact to regenerate the reducing agent from the oxidized product. Following the regeneration, the regenerated reducing agent is transferred back to the reduction furnace for continued metal oxide reductions.

The reduction furnace is a vessel which receives a metal oxide ore, reduces a metal oxide comprising the metal oxide ore using a reducing agent of CO, $H_2$, or combinations thereof, and generates an oxidized product of $CO_2$, $H_2O$, or combinations thereof as a result of the metal oxide reduction. In a particular embodiment, the metal oxide is an iron oxide, the reducing agent is CO, the oxidized product is $CO_2$, and the oxidized product, the calcium oxide, and the vanadium oxide interact to regenerate a CO which is returned to the reduction furnace for continued operations.

The regeneration is promoted by mixing a generated slag comprising calcium oxide with a source of vanadium oxide, and contacting the resulting mixture with the exhausted oxidized agent. In an embodiment, the generated slag originates from a reduction furnace and the source of vanadium oxide is a gasifier slag. The regenerating reaction is highly exothermic, and the resulting heated reduction agent is returned to the reduction furnace to assist in further metal oxide reduction. Recycling of the reducing agent in a loop within the system as suggested significantly reduces the required amount of reducing agent necessary to facilitate metal oxide reductions in the reduction furnace.

Various embodiments of the methodology disclosed are further demonstrated and described in the following description.

DETAILED DESCRIPTION

Figure 1:
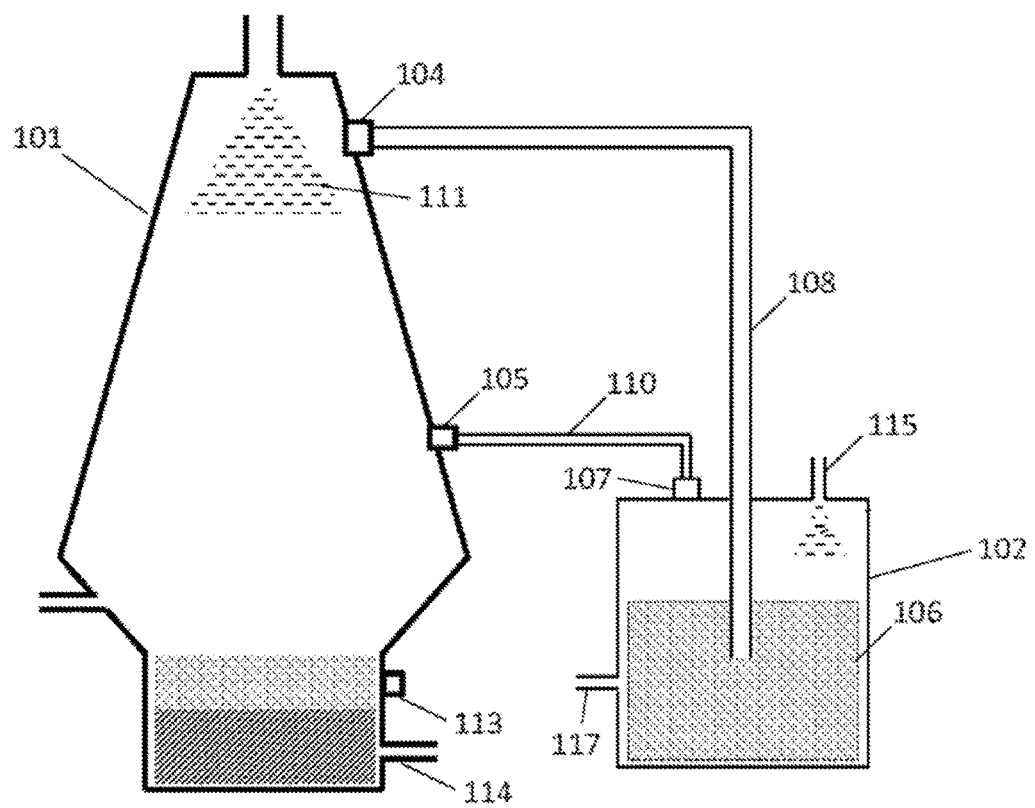
FIG. 1 illustrates an embodiment of the system and method for the regeneration and recirculation of a reducing agent.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a system and methodology for the regeneration and recirculation of a reducing agent utilized in a reduction reactor.

The current disclosure relates to metal oxide reduction using a reducing agent of CO, $H_2$, or combinations thereof, where the reduction generates a metal, reduced metal oxides, ash/slag, and an oxidized product of $CO_2$, $H_2O$, or combinations thereof. The disclosure recycles the oxidized product by generating an exhaust of the oxidized product from a reducing reactor, transferring the exhaust to a mixing vessel where the oxidized product, a calcium oxide and a vanadium oxide interact to generate heat and regenerate the reducing agent from the oxidized product, followed by transfer of the regenerated reducing agent back to the reduction furnace for continued metal oxide reductions. The regeneration additionally produces a calcium vanadate, and is promoted by mixing a generated slag comprising calcium oxide with a source of vanadium oxide, and contacting the resulting mixture with the exhausted oxidized agent. The generated slag may originate from the reduction furnace or some other process, and is generally a molten mixture of oxide components originating from additives and carbon feedstock impurities that are produced as a by-product during high temperature industrial operations such as iron and steel making. In certain embodiments, in order to drive the reaction among the calcium oxide, vanadium oxide, and exhausted oxidized product, the generated slag is produced by some process occurring on-site, and heat required to promote the reaction is supplied by the generated slag. The regenerating reaction is highly exothermic, and the resulting heated reduction agent is returned to the reduction furnace to assist in further metal oxide reduction. Recycling of the reducing agent in a loop within the system as suggested significantly reduces the required amount of reducing agent necessary to facilitate metal oxide reductions in the reduction furnace, such as a blast furnace or a direct reduced iron furnace.

In a particular embodiment, the reducing agent is CO, the oxidized product is $CO_2$, and the regenerated agent produced in the mixing vessel and returned to the reduction furnace for continued use is CO. In another embodiment, some portion of the CO reducing agent is generated within the reduction furnace through combustion of a carbonaceous fuel, and recycling of the CO reducing agent acts to mitigate the required amount of carbon feed necessary to the reduction furnace. In another embodiment, the reducing agent is $H_2$, the oxidized product is $H_2O$, and the regenerated agent produced in the mixing vessel and returned to the reduction furnace is $H_2$.

Metal oxide reductions using a reducing agent of CO, $H_2$, or combinations thereof are well known. Typically a reduction furnace receives a charge comprising at least the metal oxide $Me_xO_y$; and facilitates contact between the metal oxide and the reducing agent, producing a metal, metal oxide, ash/slag, and an oxidized product, where the oxidized product is an oxidized form of the reducing agent. Continued reductions may occur in the reduction furnace and generally a molten metal and oxides (slags) are tapped off, while exhausted waste gas comprised of the oxidized product is ejected through an exhaust. Generally, the exhaust is usually cleaned, further combusted, and utilized as preheat for an incoming pre-heated air or some other purpose. For example, in a process where the metal oxide is an iron oxide and the reducing agent is entirely or partly CO; a reduction furnace receives a charge comprising a carbonaceous fuel, a fluxing agent comprising a calcium compound, and an iron oxide ore, and receives pre-heated air through various tuyeres. The charge descends through the reduction furnace, is heated, and the carbonaceous fuel combusts to form carbon dioxide and exothermically generated heat. As higher temperatures are encountered during the descent, carbon dioxide reacts with carbon to produce carbon monoxide (or hydrogen if $CH_4$ is used), which acts as the main reducing agent in the furnace. The heat of the reduction furnace additionally decomposes the fluxing agent and generates calcium oxide, which reacts with acidic oxides and minerals present in the iron oxide ore to form a molten slag. The slag and metal descend in the reduction furnace to a collection are where they segregate and separate by specific gravity into metal and slag zones. The molten iron and slag are separately tapped off, and waste gas comprising largely $CO_2$ and some CO is exhausted. See e.g., Geerdes, M., Toxopeus, H. & van der Vliet, C., *Modern Blast Furnace Ironmaking* ($2^{nd}$, 2009), among others.

The current disclosure modifies the metal oxide reduction process by mixing a generated slag comprising calcium oxide with a source of vanadium oxide, combining this with the exhaust gas of oxidized product issued from the reduction furnace exhaust, and producing a regenerated agent which is returned to the reduction furnace to function as the reducing agent. An embodiment of the system and methodology is represented at FIG. 1, illustrating a reduction furnace 101 and a mixing vessel 102. The reduction furnace 101 comprises furnace exhaust 104 and a furnace inlet 105, and as depicted additionally comprises slag tap 113. The mixing vessel 102 encompasses a slag mixing zone 106, regenerated agent outlet 107, vanadium oxide inlet 115, and generated slag inlet 117. At FIG. 1, furnace exhaust 104 is in fluid communication with mixing zone 106 through conduit 108, vanadium oxide inlet 115 is in fluid communication with mixing zone 106, and generated slag inlet 117 is in fluid communication with mixing zone 106. Additionally, regenerated agent outlet 107 is in fluid communication with mixing zone 106 and further in fluid communication with furnace inlet 105 through conduit 110. In operation, a charge 111 comprising a metal oxide ore is inserted reduction furnace 101, and within reduction furnace 101, a $Me_xO_y$ metal oxide comprising the metal oxide ore contacts a reducing agent of CO, $H_2$, or a combination thereof. The contact generates an oxidized product of $CO_2$, $H_2O$, or a combination, and typically a molten metal. The molten metal is tapped from metal tap 114 and the oxidized product issues through exhaust 104.

Following the generation of the oxidized product and issue through exhaust 104 as described, some portion of the oxidized product is withdrawn from furnace exhaust 104 and transferred through conduit 108 to mixing zone 106 of mixing vessel 102. Additionally, a vanadium oxide feedstock is supplied to mixing zone 106 through vanadium oxide inlet 115, and a generated slag comprising CaO is supplied to mixing zone 106 through generated slag inlet 117. In an embodiment, slag tap 113 is in fluid communication with generated slag inlet 117, and a furnace slag from reduction furnace 101 comprises the generated slag. Within mixing zone 106, the CaO comprising the generated slag, the vanadium oxide comprising the vanadium oxide feedstock, and the oxidized product react to form a calcium vanadate and a regenerated agent, where as discussed, the oxidized product comprises $CO_2$, $H_2O$, or combinations and the regenerated agent comprises CO, $H_2$, or combinations. Following the reaction, the regenerated agent of CO, $H_2$, or combinations is exhausted from regenerated agent outlet 107 of mixing vessel 102 and returned to reduction furnace 101 through conduit 110 and furnace inlet 105. In a cyclic process, the regenerated agent returned to reduction furnace 101 supplements the reducing agent utilized for continuing metal oxide reduction. In an embodiment some portion of the generated heat is transferred to reduction furnace 101 to aid in continuing operations. In this manner, the regeneration in a loop such as that of FIG. 1 mitigates the quantity of reducing agent which must be supplied to the reduction furnace in order to facilitate metal oxide reductions. When the reducing agent is generated through combustion of a carbonaceous fuel within reduction furnace 101, the regeneration and recycling reduce the required amount of carbon feed necessary to reduction furnace 101.

Particularized operations occurring within a reduction furnace are specific to the specific metal oxide reductions occurring, however when the term "reduction furnace" is used in this disclosure, this describes any vessel which receives a metal oxide ore, reduces a metal oxide comprising the metal oxide ore using a reducing agent of CO, $H_2$, or combinations thereof, and generates an oxidized product of $CO_2$, $H_2O$, or combinations thereof as a result of the reduction.

The generated slag may be any substance comprising CaO. Typically the generated slag is a blast furnace (BF) slag, a basic oxygen furnace (BOF) slag, a ladle furnace (LF) slag, an electric arc furnace (EAF) slag, a thermite slag, or combinations thereof. In a particular embodiment, the generated slag comprises at least 5 wt. %, 15 wt. %, or 25 wt. % CaO. In another embodiment, the slag additionally comprises iron oxide, $SiO_2$, $Al_2O_3$, or combinations thereof, where the iron oxide comprises FeO, $Fe_2O_3$, $Fe_3O_4$, or combinations thereof. In a further embodiment, the generated slag comprises less than 2 wt. %, 18 wt. %, 28 wt. %, 50 wt. %, or 75 wt. % vanadium oxide, where the vanadium oxide is VO, $V_2O_3$, $V_3O_5$, $VO_2$, or combinations thereof. Determinations of the oxide content of the generated slag may be accomplished using means in the art, for example, X-ray Fluorescence Spectrometry.

The vanadium oxide feedstock may be any substance comprising a vanadium oxide, where the vanadium oxide is VO, $V_2O_3$, $V_3O_3$, $VO_2$, or combinations thereof. For example, the vanadium oxide feedstock may be a petcoke ash comprising vanadium oxide, a petcoke slag comprising vanadium oxide, or combinations thereof. In an embodiment, the vanadium oxide feedstock comprises at least 2 wt. %, 7 wt. %, or 18 wt. % vanadium oxide. In another embodiment, the vanadium oxide feedstock additionally comprises iron oxide, $SiO_2$, $Al_2O_3$, or combinations thereof, where the iron oxide comprises FeO, $Fe_2O_3$, $Fe_3O_4$, or combinations thereof. In a further embodiment, the vanadium oxide feedstock comprises less than 15 wt. %, 30% wt. %, or 60% wt. % CaO. The oxide content of the vanadium oxide feedstock may be accomplished using means in the art, for example, X-ray Fluorescence Spectrometry. The vanadium feedstock is not needed for the regeneration of the reduced gas products (CO, $H_2$, or combinations thereof) but facilitates the regeneration process.

When the reducing agent comprises CO, the CaO, vanadium oxides, and the oxidized product of $CO_2$ within mixing zone 106 renders the $CO_2$ thermodynamically less stable by introducing a more favored phase into the system. The arrangement generates a significant amount of energy by facilitating the formation of a calcium vanadate, typically calcium orthovanadate $(CaO)_3(V_2O_3)$, from calcium monoxide (CaO) and a vanadium oxide, typically vanadium sesquioxide ($V_2O_3$). The calcium vanadate may also be $(CaO)(V_2O_5)$, $(CaO)_2(V_2O_5)$, or combinations thereof. The oxidation reaction is highly exothermic generating heat equal to 664 kJ per mole of $(CaO)_3(V_2O_5)$. Under these conditions, the $CO_2$ can become thermodynamically less stable and begin to dissociate into CO and $O_2$. See Nakano et al., "$CO_2$ and $H_2O$ gas conversion into CO and $H_2$ using highly exothermic reactions induced by mixing industrial slags," Int. J. Hydrogen Energ. 39 (2014). For example, the overall energy balance of each reaction involved to form $(CaO)_3(V_2O_5)$ at a temperature of 1300° C. and according to the reactions below is:

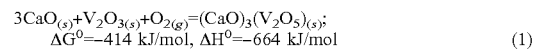

$$3CaO_{(s)} + V_2O_{3(s)} + O_{2(g)} = (CaO)_3(V_2O_5)_{(s)};$$
$$\Delta G^0 = -414 \text{ kJ/mol}, \Delta H^0 = -664 \text{ kJ/mol} \quad (1)$$

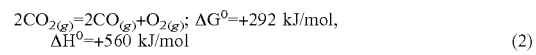

$$2CO_{2(g)} = 2CO_{(g)} + O_{2(g)}; \Delta G^0 = +292 \text{ kJ/mol},$$
$$\Delta H^0 = +560 \text{ kJ/mol} \quad (2)$$

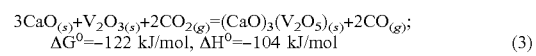

$$3CaO_{(s)} + V_2O_{3(s)} + 2CO_{2(g)} = (CaO)_3(V_2O_5)_{(s)} + 2CO_{(g)};$$
$$\Delta G^0 = -122 \text{ kJ/mol}, \Delta H^0 = -104 \text{ kJ/mol} \quad (3)$$

where $\Delta G^0$ represents the standard Gibbs free energy for reaction and $\Delta H^0$ represents the standard enthalpy for reaction. Subscript annotations (s) and (g) indicate states of the phases, solid and gas, respectively. Negative standard Gibbs free energy indicates the spontaneity of the forward reaction while positive standard Gibbs free energy indicates the spontaneity of the backward reaction. Negative enthalpy corresponds to heat generated from the reaction while positive enthalpy relates to heat required for the reaction. Reaction (1) includes a sub-reaction where $V_2O_{3(s)}$ is incorporated with $O_{2(g)}$ to form $V_2O_{5(s)}$, which is the key to the $CO_2$ conversion reaction. The two fundamental reactions (1) and (2) generally produce the $CO_2$ conversion of this disclosure. As seen in reaction (1), the formation of calcium vanadate such as $(CaO)_3(V_2O_5)$ releases an enormous amount of heat (664 kJ/mol) out of the system by combining CaO and $V_2O_3$. However, it requires at least 292 kJ/mol of Gibbs free energy to the system to favorably dissociate $CO_2$ into CO and $O_2$, as seen in reaction (2). The energy balance in the overall reaction (3) implies that the energy produced from reaction (1) compensate the energy required in reaction (2) and, consequently, a calcium vanadate such as $(CaO)_3(V_2O_5)$ spontaneously forms in the presence of $CO_2$ by producing CO as by-product. Note $\Delta G^0$ must be negative for a spontaneous reaction to proceed to the right. As the reaction goes to the right, the $CO_2$ is resorbed and its oxygen is given off to form calcium vanadate such as $(CaO)_3(V_2O_5)$, generating CO gas as a product. As discussed, this regenerated agent of CO is recycled to reduction furnace 101 to supplement the reducing agent of CO utilized in reduction furnace 101. Additionally, excess heat generated by the exothermic reaction may be transferred to reduction furnace 101 to support operations, or used in some other manner to increase the efficiency of an overall process. A quantity of the regenerated agent may be utilized for some other purposes including power generation and chemical production with or without the excess heat generated.

Similarly, when the reducing agent comprises $H_2$, the CaO, vanadium oxide, and the oxidized product of $H_2O$ within mixing zone 106 renders the $H_2O$ thermodynamically less stable. This arrangement facilitates formation of a calcium vanadate generally according to the reaction below (at 1300° C.):

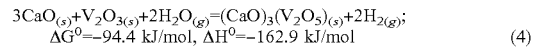
$$3CaO_{(s)}+V_2O_{3(s)}+2H_2O_{(g)}=(CaO)_3(V_2O_5)_{(s)}+2H_{2(g)};$$
$$\Delta G^0=-94.4 \text{ kJ/mol}, \Delta H^0=-162.9 \text{ kJ/mol} \quad (4)$$

Generally in reaction (4), oxygen is removed from $H_2O$ to form calcium vanadate such as $(CaO)_3(V_2O_5)$, with $H_2$ produced as a by-product. Reaction (4) includes a sub-reaction where $V_2O_{3(s)}$ is incorporated with $O_{2(g)}$ to form $V_2O_{5(s)}$, which is the key to the $CO_2$ conversion reaction. Similar to before, this regenerated agent of $H_2$ is recycled to reduction furnace 101 to supplement the reducing agent of $H_2$ utilized in reduction furnace 101, and excess heat generated by the exothermic reaction may be transferred to reduction furnace 101 to support operations, or used in some other manner to increase the efficiency of an overall process. See Nakano et al., *Int. J. Hydrogen Energ.* A quantity of the regenerated agent may be utilized for some other purposes with or without the excess heat generated.

In a particular embodiment, the furnace slag, the vanadium oxide feedstock, and the oxidized product form a mixture in mixing zone 106, and the mixture has a temperature of at least 669° C. This temperature is generally the minimal sufficient to enable necessary reaction kinetics. In another embodiment, the generated slag has a temperature of at least 669° C., and the temperature of the mixture in mixing zone 106 is maintained through the addition of the generated slag. In a further embodiment, the generated slag is a molten slag having a temperature of at least 669° C., and the vanadium oxide feedstock is a solidified, granulated feedstock such as a granulated gasifier slag.

In another embodiment, a material comprising carbon is additionally added to mixing zone 106. In some embodiments a material such as coal or petcoke is added, and in a further embodiment, the vanadium oxide feedstock additionally comprises carbon. In particular embodiments, the vanadium oxide feedstock comprises at least 2 wt. %, preferably at least 10 wt. % carbon. For example, the vanadium oxide feedstock may be a gasification slag having a significant carbon content due to typical gasifier carbon conversion rates. In these embodiments, extra steps may be employed to efficiently induce a reaction of the carbon with the oxidized product gases to generate excess heat and a reaction of the CaO and vanadium oxides with the oxidized product gases at separate stages, which are independent of one another.

In other embodiments when the reducing agent is CO and the oxidized product is $CO_2$, preferred $CO_2$ conversions can be attained through adjustment of generated slag, vanadium oxide feedstock, and oxidized product introduction rates into the mixing vessel. In a particular embodiment, the generated slag, vanadium oxide feedstock, and reduction $CO_2$ are transferred to the mixing vessel at controlled rates such that the mixture comprises 0.1-3.0 ton $CO_2$ and 0.2-3.5 ton CaO per 1.0 ton vanadium oxide. In another embodiment, the mixture comprises 0.2-1.3 ton $CO_2$ and 0.5-2.5 ton CaO per 1.0 ton vanadium oxide.

Figure 2:
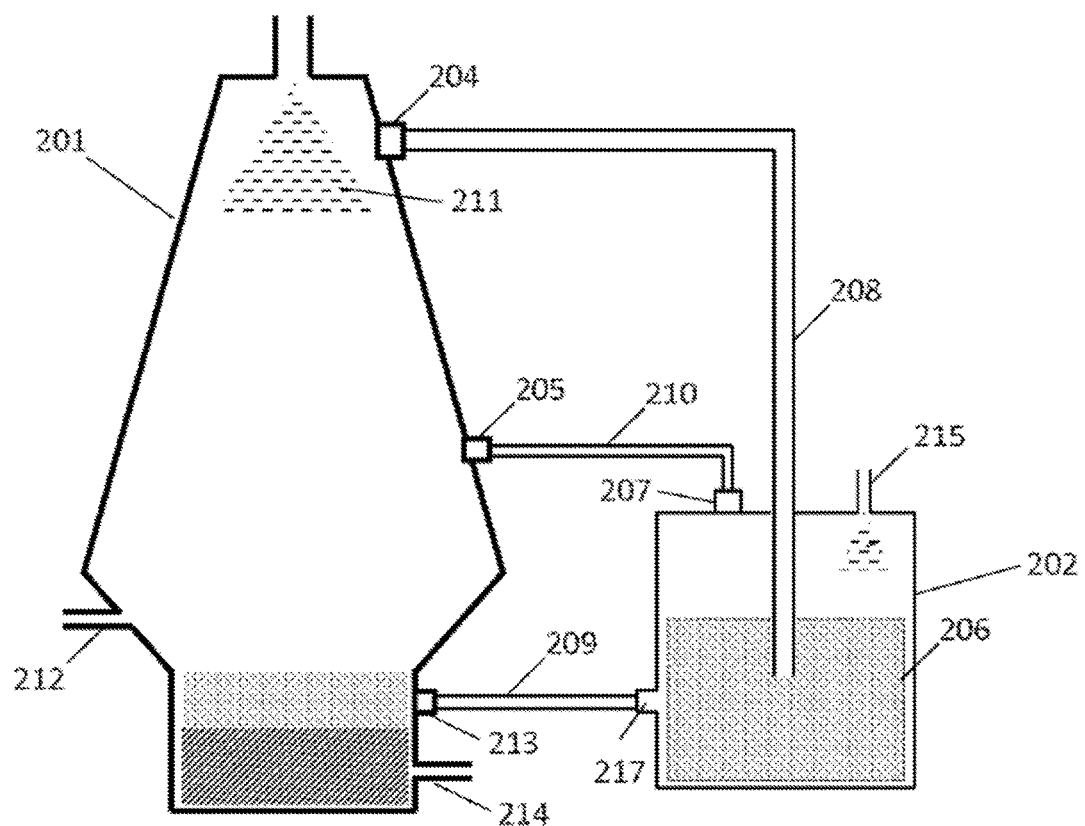
FIG. 2 illustrates another embodiment of the system and method for the regeneration and recirculation of a reducing agent.

A particular embodiment of the system and methodology is represented at FIG. 2, illustrating reduction furnace 201 comprising slag tap 213, furnace exhaust 204, and a furnace inlet 205, and mixing vessel 202 comprising slag mixing zone 206, regenerated agent outlet 207, vanadium oxide inlet 215, and generated slag inlet 217. At FIG. 2, furnace exhaust 204 and mixing zone 206 are in fluid communication through conduit 208, vanadium oxide inlet 215 is in fluid communication with mixing zone 206, and generated slag inlet 217 is in fluid communication with mixing zone 206 through slag tap 213 and conduit 209. Additionally, regenerated agent outlet 207 is in fluid communication with mixing zone 206 and further in fluid communication with furnace inlet 205 through conduit 210. A charge 211 comprising a carbonaceous fuel, a fluxing agent comprising calcium, and a metal oxide ore comprising an iron oxide such as $Fe_2O_3$ and/or $Fe_3O_4$ is inserted into reduction furnace 201. The carbonaceous fuel contacts pre-heated air (or oxygen containing gas) introduced through tuyere 212 and generates a reducing gas, CO, typically produced through combustion of carbon and oxygen to generate $CO_2$, followed by, at higher temperatures within reduction furnace 201, reaction of carbon and $CO_2$ to generate CO. The reducing agent of CO reduces the iron oxide in the metal oxide ore comprising the charge and generates an oxidized product of $CO_2$ and a molten metal. The molten metal is tapped from metal tap 214 and the oxidized product of $CO_2$ issues through exhaust 204. Additionally, furnace slag is tapped from slag tap 213 and transferred to mixing zone 206 via conduit 209, where the furnace slag comprises CaO and the CaO comprises some portion of the fluxing agent.

Some portion of the oxidized product of $CO_2$ is transferred through conduit 208 to mixing zone 206, and a vanadium oxide feedstock is supplied through vanadium oxide inlet 215 and some portion of the furnace slag is supplied through generated slag inlet 217. In mixing zone 206, the CaO comprising the furnace slag, the vanadium oxide comprising the vanadium oxide feedstock, and the oxidized product of $CO_2$ form a calcium vanadate and a regenerated agent of CO along with excess heat. The regenerated agent of CO is exhausted from regenerated agent outlet 207 and returned to reduction furnace 201 through conduit 210 and furnace inlet 205.

The disclosure thus provides a method for regeneration and recirculation of a reducing agent generally comprising:
  (i) inserting a metal oxide ore into a reduction furnace;
  (ii) contacting the iron oxide ore and a reducing agent and generating an oxidized product;
  (iii) transferring a portion of the oxidized product to a mixing vessel;

(iv) supplying a vanadium oxide feedstock and generated slag to the mixing vessel, and mixing the vanadium oxide feedstock, the generated slag, and the portion of the oxidized product to produce heat, a calcium vanadate and a regenerated agent;

(v) displacing a portion of the regenerated agent to the reduction furnace; and (vi) repeating steps (i) through (v) using the portion of the regenerated agent as a portion of the reducing agent.

Here, "metal oxide ore" means a material comprising a metal oxide having a composition $Me_xO_y$, where Me is a metal. In an embodiment, the metal is iron, and in a further embodiment, the metal oxide is $Fe_2O_3$, $Fe_3O_4$, or combinations thereof.

"Reducing agent" means gaseous CO, gaseous $H_2$, or combinations thereof. The gaseous CO and $H_2$ may originate from solid carbonaceous fuel, gaseous $CH_4$. Similarly, "oxidized product" means $CO_2$, $H_2O$, or combinations thereof resulting from reduction of the metal oxide when contacted by the reducing agent, where "reduction" as it applies to the metal oxide means the loss of oxygen from the $Me_xO_y$ composition to generate an $Me_wO_z$ composition, where $x/y < w/z$. In an embodiment the reducing agent is CO and the oxidized product is $CO_2$. In another embodiment, the reducing agent is $H_2$ and the oxidized product is $H_2O$.

"Generated slag" means a substance comprising CaO and vanadium oxide feedstock means a substance comprising a vanadium oxide, as discussed. The generated slag, the vanadium oxide feedstock, or both may be fluxed with a substance such as oxides and carbonates comprising Al, Ca, Fe, K, Mg, Na, Si, V, or combinations thereof, in order to facilitate the reaction.

"Calcium vanadate" means an oxide compound in the form of $(CaO)_3(V_2O_5)$, $(CaO)_2(V_2O_5)$, $(CaO)(V_2O_5)$, or combinations thereof, where the calcium vanadate comprises some portion of the CaO from the generated slag and further comprises some portion of the vanadium oxide from the vanadium oxide feedstock. The formation of calcium vanadate may be confirmed using means known in the art, such as X-ray Diffraction Spectroscopy. See e.g., Nakano et al., "$CO_2$ and $H_2O$ gas conversion into CO and $H_2$ using highly exothermic reactions induced by mixing industrial slags," *International Journal of Hydrogen Energy* 39 (2014)

"Regenerated agent" means CO, $H_2$, or combinations thereof produced from the oxidized product when the vanadium oxide feedstock, the generated slag, and the oxidized product are mixed. "Mixing" as it pertains to the vanadium oxide feedstock, the generated slag, and the oxidized product means bringing the vanadium oxide feedstock, the generated slag, and the oxidized product into sufficient proximity such that the calcium vanadate and the regenerated agent are produced. In an embodiment where the reducing agent is CO and the oxidized product is $CO_2$, the regenerated agent is CO. In another embodiment where the reducing agent is $H_2$ and the oxidized product is $H_2O$, the regenerated agent is $H_2$.

Additionally, when used, "carbonaceous fuel" means a fuel comprising carbon. In an embodiment the carbonaceous fuel comprises solid carbon, such as coal, coke, char, ash, slag, and the like. In a particular embodiment, the carbonaceous fuel is at least 20 wt. % fixed carbon, and in an additional embodiment, the carbonaceous fuel is at least 40 wt. % fixed carbon, and in a further embodiment, the carbonaceous fuel is at least 80 wt. % fixed carbon.

Thus, presented here is a system and method for the regeneration and recirculation of a reducing agent from an oxidized product gas exhausted from a reduction furnace, where the reduction furnace utilizes the reducing agent to reduce a metal oxide. The method uses the oxidation product, calcium oxide, and vanadium oxide to produce calcium vanadate, and is promoted by fluxing a generated slag comprising calcium oxide with a source of vanadium oxide and contacting the resulting mixture with the exhausted oxidation product to facilitate the formation of a calcium vanadate compound and a regenerated agent. The overall mixed slag chemistry is controlled by the fluxing agent composition with respect to the generated slag and the vanadium oxide feedstock. The resulting regenerated agent is returned to the reduction furnace to assist in further metal oxide reduction. Reducing agent recycling in a loop within the system as suggested significantly reduces the required amount of reducing agent necessary to facilitate metal oxide reductions in the reduction furnace.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

COMPOSITION OF METALLURGICAL SLAGS AND GASIFICATION PETCOKE ASHES

| (wt. %) | $Al_2O_3$ | CaO | $FeO_3$ | MgO | MnO | NiO | $SiO_2$ | $V_2O_5$ |
|---|---|---|---|---|---|---|---|---|
| BF slag | 8-24 | 30-56 | 0.5-1 | 1-18 | 0.5-2 | — | 28-38 | — |
| BOF slag | 1-7 | 45-60 | 10-35 | 5-17 | 2-14 | — | 8-22 | — |
| EAF slag | 2-9 | 35-60 | 15-30 | 5-15 | 1-8 | — | 9-20 | |
| LF slag | 5-35 | 30-60 | 0.1-15 | 1-10 | 0-5 | — | 2-35 | |
| Delayed coke ash | 6.9 | 2.2 | 53 | 0.3 | — | 12 | 10.1 | 58.2 |
| Shot coke ash | 5.9 | 3.6 | 4.5 | 0.6 | — | 10.2 | 13.8 | 57 |
| Fluid coke ash | 9.4 | 8.9 | 31.6 | 0.4 | — | 2.9 | 23.6 | 19.7 |
| Flexicoke ash | 0.5 | 2.4 | 2.5 | 0.2 | — | 11.4 | 1.6 | 74.5 |

(Balance accounts for the remaining minor constituents including $K_2O$, $Na_2O$, $TiO_2$, and $SO_3$).

What is claimed is:

1. A method for the regeneration and recirculation of a reducing agent comprising:
   inserting a charge into a reduction furnace, where the charge comprises a metal oxide ore, where the metal oxide ore comprises a metal oxide;
   contacting the metal oxide ore and a reducing agent, where the reducing agent is CO, $H_2$, or combination thereof, and generating an oxidized product, where the oxidized product is $CO_2$, $H_2O$, or combinations thereof;
   transferring a portion of the oxidized product to a mixing vessel;
   supplying a vanadium oxide feedstock to the mixing vessel and supplying a generated slag to the mixing vessel, where the vanadium oxide feedstock comprises a vanadium oxide where the vanadium oxide is VO, $V_2O_3$, $V_3O_5$, $VO_2$, or combinations thereof, and where the generated slag comprises CaO, and mixing the vanadium oxide feedstock, the generated slag, and the portion of the oxidized product in the mixing vessel, and generating a calcium vanadate and a regenerated agent, where the regenerated agent is CO, $H_2$, or combination thereof;
   displacing a portion of the regenerated agent to the reduction furnace; and
   repeating the inserting step, the contacting step, the transferring step, the supplying step, and the displacing step using the portion of the regenerated agent as some portion of the reducing agent, thereby regenerating and recirculating the reducing agent.

2. The method of claim 1 where mixing the vanadium oxide feedstock, the generated slag, and the portion of the oxidized agent forms a mixture, and further comprising establishing the mixture at a temperature of at least 669° C.

3. The method of claim 2 where the generated slag has a temperature of at least 669° C.

4. The method of claim 3 where transferring the portion of the oxidized product to the mixing vessel occurs at an oxidized product mass transfer rate, supplying the vanadium oxide feedstock to the mixing vessel occurs at a vanadium oxide mass transfer rate, and supplying the generated slag to the mixing vessel occurs at a generated slag mass transfer rate, and further comprising adjusting the oxidized product mass transfer rate, the vanadium oxide mass transfer rate, and the generated slag mass transfer rate to establish a specific composition of the mixture, where the specific composition comprises greater than 0.1 ton and less than 3.0 ton of the oxidized product per 1.0 ton of vanadium oxide and greater than 0.2 and less than 3.5 ton of CaO per 1.0 ton vanadium oxide.

5. The method of claim 4 where the generated slag is comprised of at least 5 wt. % CaO.

6. The method of claim 5 where the vanadium oxide feedstock is comprised of at least 2 wt. % of the vanadium oxide.

7. The method of claim 4 where the generated slag is comprised of at least 5 wt. % CaO and less than 75 wt. % of the vanadium oxide, and where the vanadium oxide feedstock is comprised of at least 2 wt. % of the vanadium oxide and less than 60 wt. % CaO.

8. The method of claim 1 where the reducing agent is CO, the oxidized product is $CO_2$, and the generated agent is CO.

9. The method of claim 8 where the charge further comprises a carbonaceous fuel and further comprising:
   combusting the carbonaceous fuel and generating a quantity of CO; and
   utilizing some portion of the quantity of CO as some portion of the reducing agent.

10. The method of claim 9 where combusting the carbonaceous fuel generates a combustion $CO_2$ a portion of which reacts with the carbon comprising the carbonaceous fuel and generating the quantity of CO.

11. The method of claim 10 where the carbonaceous fuel comprises coal, petcoke, char, ash, slag, or mixtures thereof.

12. The method of claim 11 where the metal oxide is an iron oxide.

13. The method of claim 10 where the charge further comprises a fluxing agent and further comprising:
   generating a furnace slag comprising a slag CaO, where the slag CaO is comprised of some portion of the fluxing agent; and
   transferring a portion of the furnace slag to the mixing vessel, thereby supplying the generated slag to the mixing vessel.

14. The method of claim 1 where the reducing agent is $H_2$, the oxidized product is $H_2O$, and the generated agent is $H_2$.

15. The method of claim 14 where the generated slag is comprised of at least 5 wt. % CaO and less than 75 wt. % of the vanadium oxide, and where the vanadium oxide feedstock is comprised of at least 2 wt. % of the vanadium oxide and less than 60 wt. % CaO.

16. The method of claim 15 where the reducing agent is CO, the oxidized product is $CO_2$, and the generated agent is CO, and where the charge further comprises a carbonaceous fuel and further comprising:
   combusting the carbonaceous fuel and generating a quantity of CO; and
   utilizing some portion of the quantity of CO as some portion of the reducing agent.

17. The method of claim 16 where the metal oxide is an iron oxide.

18. The method of claim 17 where the reduction furnace further comprises a slag tap in fluid communication with the generated slag inlet of the mixing vessel, and where the charge further comprises a fluxing agent, and further comprising:
   generating a furnace slag comprising a slag CaO, where the slag CaO is comprised of some portion of the fluxing agent; and
   transferring a portion of the furnace slag through the slag tap and through the generated slag inlet to the mixing vessel, thereby supplying the generated slag to the mixing vessel.

19. The method of claim 18 where the carbonaceous fuel comprises coal, petcoke, char, ash, slag or mixtures thereof.

20. A method for the regeneration and recirculation of a reducing agent comprising:
   obtaining a system comprising,
      a reduction furnace comprising a reduction furnace exhaust and a furnace inlet;
      a mixing vessel comprising a mixing zone, a vanadium oxide inlet, a generated slag inlet, and a regenerated agent outlet, where the mixing zone is in fluid communication with the furnace exhaust, and where the vanadium oxide inlet is in fluid communication with the mixing zone, and where the generated slag inlet is in fluid communication with the mixing zone, and where the regenerated agent outlet is in fluid communication with the mixing zone and in fluid communication with the furnace inlet;
   inserting a charge into the reduction furnace, where the charge comprises a metal oxide ore, where the metal oxide ore comprises a metal oxide;

contacting the metal oxide ore and a reducing agent in the reduction furnace, where the reducing agent is CO, $H_2$, or combination thereof, and generating an oxidized product, where the oxidized product is $CO_2$, $H_2O$, or combinations thereof;

exhausting a portion of the oxidized product from the furnace exhaust and transferring a quantity of the portion of the oxidized product to the mixing zone of the mixing vessel;

supplying a vanadium oxide feedstock through the vanadium oxide inlet and into the mixing zone of the mixing vessel and supplying a generated slag through the generated slag inlet to the mixing zone of the mixing vessel, where the vanadium oxide feedstock comprises a vanadium oxide where the vanadium oxide is VO, $V_2O_3$, $V_3O_5$, $VO_2$, or combinations thereof, and where the generated slag has a temperature of at least 669° C. and the generated slag comprises CaO, and mixing the vanadium oxide feedstock, the generated slag, and the portion of the oxidized product in the mixing zone of the mixing vessel to generate a mixture, where the mixture has a temperature of at least 669° C., and generating a calcium vanadate and a regenerated agent, where the regenerated agent is CO, $H_2$, or combination thereof;

displacing a portion of the regenerated agent through the regenerated agent outlet of the mixing vessel and through the furnace inlet and into the reduction furnace; and repeating the inserting step, the contacting step, the exhausting step, the supplying step, and the displacing step using the portion of the regenerated agent as some portion of the reducing agent, thereby regenerating and recirculating the reducing agent.

\* \* \* \* \*